United States Patent [19]

Gonzalez

[11] Patent Number: 5,758,859
[45] Date of Patent: Jun. 2, 1998

[54] SHOCK ABSORBING VEHICLE SEAT ASSEMBLY

[75] Inventor: Rene G. Gonzalez, Oakland County, Mich.

[73] Assignee: U.S. Government as, represented by the Secretary of the Army, Washington, D.C.

[21] Appl. No.: 613,733

[22] Filed: Feb. 12, 1996

[51] Int. Cl.$^6$ .................................................. F16M 13/06
[52] U.S. Cl. ........................... 248/619; 248/624; 248/631; 248/420
[58] Field of Search ...................... 248/619, 624, 248/631, 420, 157; 297/216.17, 216.18, 240

[56] References Cited

U.S. PATENT DOCUMENTS

| | | | |
|---|---|---|---|
| 2,284,352 | 5/1942 | Zank | 248/619 X |
| 3,043,622 | 7/1962 | Milner | 297/240 |
| 3,059,966 | 10/1962 | Spielman | 297/216.17 |
| 3,066,979 | 12/1962 | Pitts et al. | 297/240 |
| 3,705,745 | 12/1972 | Ambrosius | 248/624 X |
| 3,985,388 | 10/1976 | Hogan | 297/216.17 |
| 4,168,819 | 9/1979 | Ducrocq | 248/631 X |
| 4,358,154 | 11/1982 | Campbell | 297/216.17 |
| 5,176,356 | 1/1993 | Lorbiecki et al. | 248/157 X |
| 5,328,234 | 7/1994 | Daniel et al. | 297/216.18 X |

FOREIGN PATENT DOCUMENTS

| 1222829 | 6/1960 | France | 297/240 |
|---|---|---|---|

*Primary Examiner*—Daniel P. Stodola
*Assistant Examiner*—Gregory J. Strimbu
*Attorney, Agent, or Firm*—Peter A. Taucher; David L. Kuhn

[57] ABSTRACT

A land vehicle seat assembly for absorbing explosive shocks is mounted on the vehicle's floor. The assembly has an anti-friction pad on the floor. A base plate on the pad swings around a pin fixed to the floor at the front of the plate. Horizontal shock absorbers at either side of the plate deceleratingly retard swinging of the plate. Stops at the sides of the plate limit plate swing. The assembly includes a pair of upright rails fixed to the plate and a seat slidable on the rails. A light duty unit such as a pneumatic spring or a shock absorber connects to the plate and seat. A heavy duty shock absorber, responsive only to shocks above a certain power, is connected to the plate. The heavy duty shock absorber can absorb shocks an order of magnitude greater than does the light duty unit.

5 Claims, 3 Drawing Sheets

SHOCK ABSORBING VEHICLE SEAT ASSEMBLY

GOVERNMENT USE

The invention described here may be made, used and licensed by or for the U.S. Government for governmental purposes without paying me royalty.

BACKGROUND AND SUMMARY

One combat hazzard for military land vehicles is land mines, the detonation of which typically generates 100 to 150 g's of force on the vehicle. Occupants of the vehicle need protection not only from vertical components of the explosive forces but also lateral components. At the same time, the occupants need a reasonably comfortable ride so that avoid fatigue and internal injuries caused by continual severe jolts to the body. Also, since many land combat vehicles can survive mine blasts, it is desired that any device protecting the vehicle crew also survive the blasts.

My vehicle seat assembly meets the above requirements and concerns. The assembly has a low friction pad on the vehicle floor and a base plate on the pad, the plate swinging about a pin fixed to the floor near the front of the plate. Shock absorbers oriented laterally outward from the plate retard plate swing, and stops at edges of the plate limit this swing. The assembly has a pair of upright rails fixed to the plate and a bucket seat slidable on the rails. A relatively lighter duty unit such as a pneumatic cylinder or shock absorber fastens to the plate and seat, and this lighter unit provides a comfortable ride. A relatively stiffer, heavier duty shock absorber, that counters only shocks above a chosen intensity, is connected to the plate. The heavier shock absorber absorbs shocks an order of magnitude greater than does the lighter duty unit.

DETAILED DESCRIPTION

Figure 1:
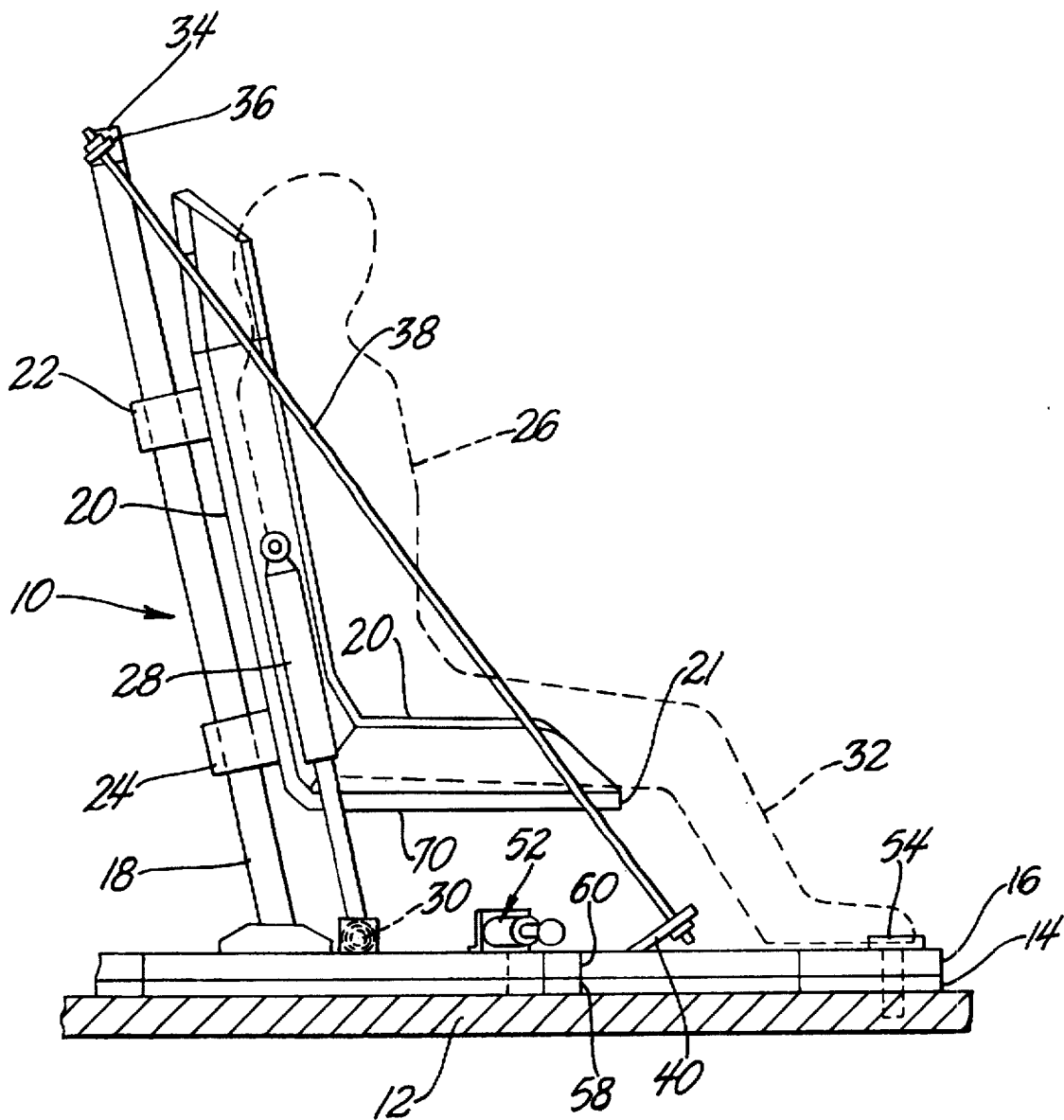
FIG. 1 is a side elevational view of my shock absorbing vehicle seat assembly with a heavy duty shock absorber omitted.
Figure 2:
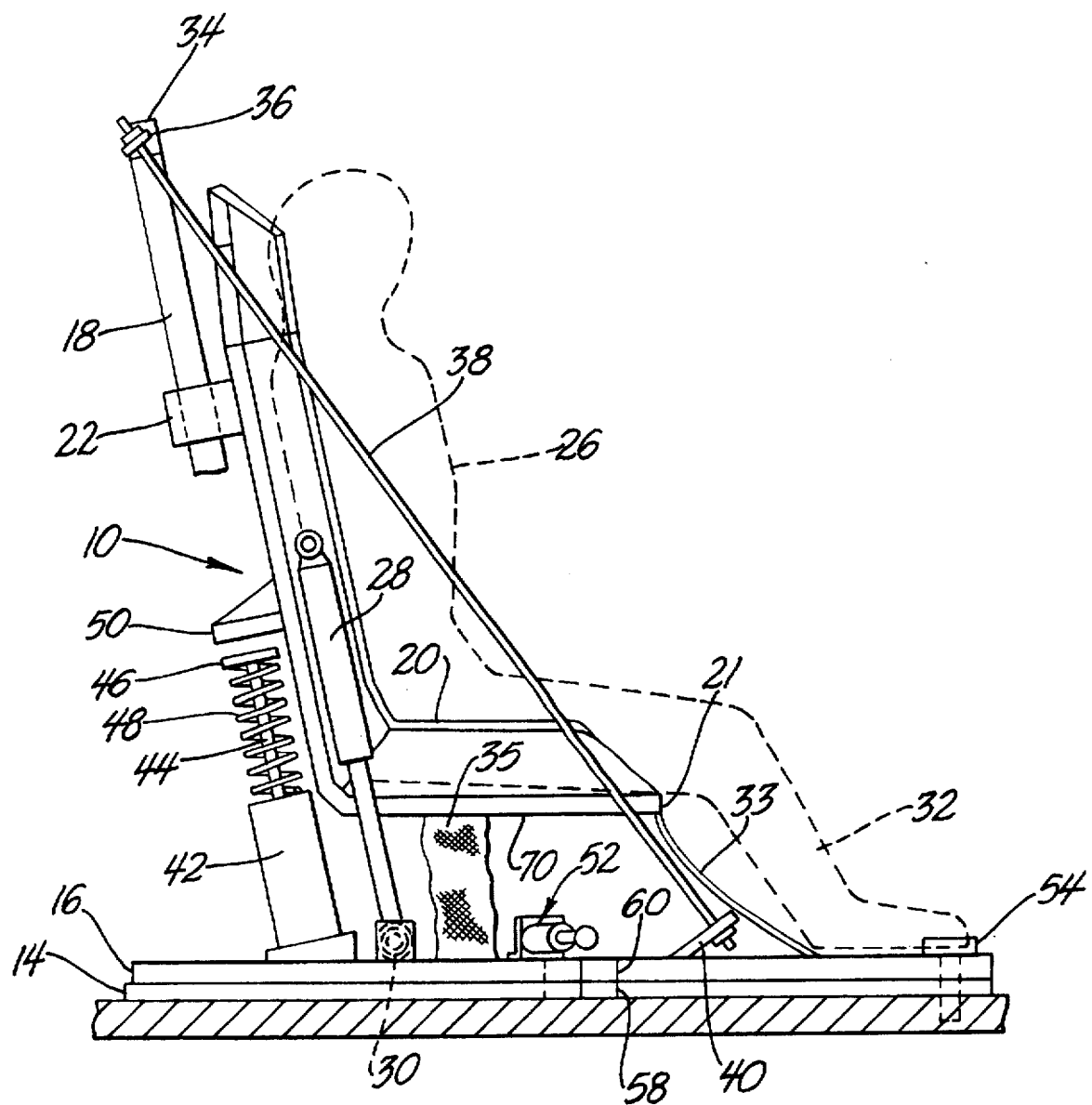
FIG. 2 is another side elevational view of the seat assembly having a rail partly removed to show the heavy duty shock aborber.
Figure 3:
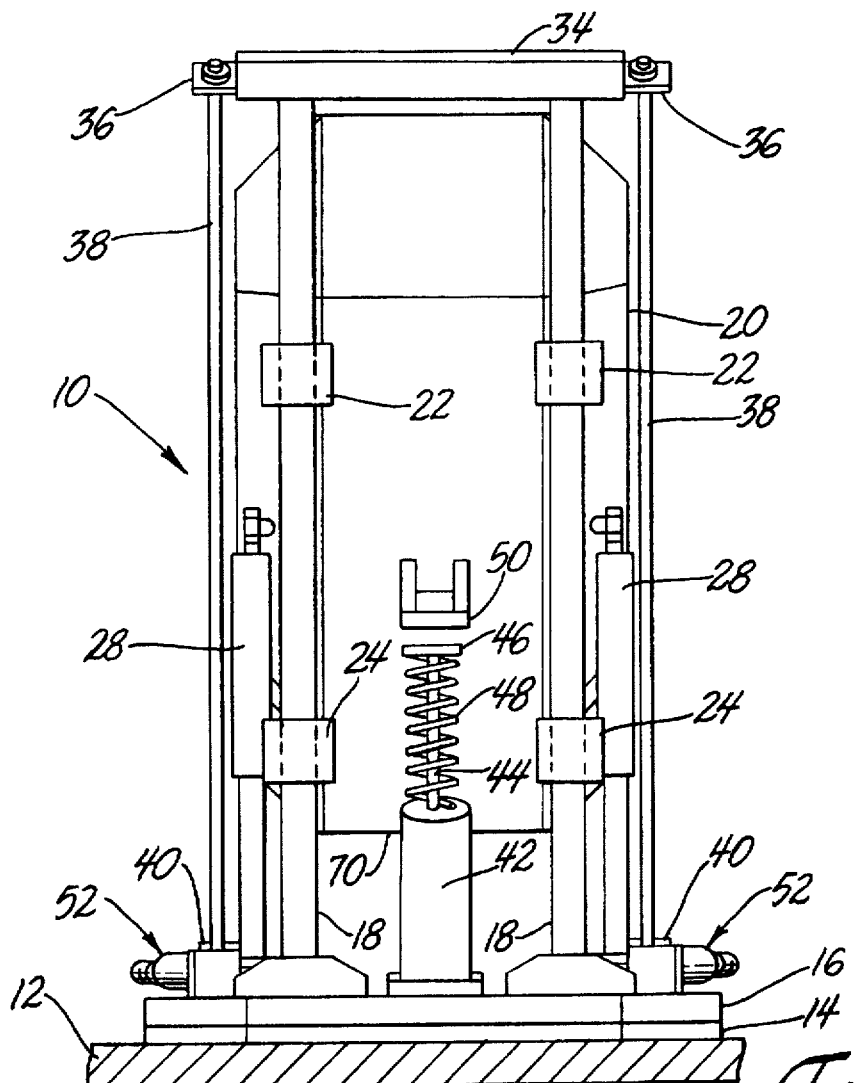
FIG. 3 is a rear elevational view of the seat assembly.

FIGS. 1, 2 and 3 show a shock absorbing vehicle seat assembly 10. Some elements of assembly 10 are omitted from one or more figures to more clearly illustrate remaining elements. The assembly is mounted to the floor 12 of a vehicle such as a military cargo truck or the US Army's High Mobility Multipurpose Wheeled Vehicle (HMMWV). Slidably faced upon the floor is a pad 14 of durable, low friction material such as nylon or polytetrafluoroethylene. Lying congruently atop pad 14 in facial sliding contact therewith is a base plate 16. Fixed to plate 16 is a pair of essentially upright rails 18, which are disposed along the back of seat 20. Rails 18 are parallel to one another, typically form an angle of 78 degrees with base plate 16, and are 12 degrees from being vertical. Seat 20 is a bucket style seat slidably mounted to rails 18 by upper guides 22 and lower guides 24, the guides fitting closely with the rails. The spine of a person 26 sitting in the seat will be parallel to rails 18.

Pneumatic cylinders 28 are connected parallel to rails 18 between base plate 16 and seat 20. The cylinders keep seat 20 from falling to base plate 16 and act as a spring suspension for the seat. Cylinders 28 can optionally have shock dampening mechanisms of conventional shock absorbers. Cylinders 28 typically have the capacity to resist shocks having a maximum force of three to five times gravitational acceleration. The cylinders' connections to plate 16 have rubber bushings 30 that absorb certain relatively high frequency vibrations from the vehicle floor 12.

By increasing or decreasing pressure in cylinders 28, the height of seat 20 can be raised or lowered, and various weights and vertical dimensions of person 26 can be accommodated. Seat height is adjusted so that lower legs 32 of person 26 are not straight up and down, but slant down and away from the forward lip 21 of seat 20 as seen in FIGS. 1 and 2. If a mine explosion accelerates floor 12, pad 14 and plate 16 toward seat 20, lower leg 32 swings up and forward and thereby transfers relatively little force to the knees of person 26.

Optionally, as seen in FIG. 2, a flexible curtain 33 of any suitable, strong material can be firmly fastened to front lip 21 of seat 20. Curtain 33 extends down and forward from the front lip to plate 16 and is fastened to the plate just behind the foot of person 26. Curtain 33 prevents lower leg 32 from swinging backard to a straight vertical position and thus coacts with seat height to protect the persons's lower leg from mine blast effects. The curtain can be dimensioned to limit upward travel of seat 20 from plate 16 so that the maximum height of seat 20 off floor 16 will still cause lower leg 32 to be slanted as seen in FIGS. 1 and 2. Additionally, side curtains, one of which is partly shown at 35, can extend from the peripheral edge of the seat's surface 70 to plate 16. Curtains 33 and 35 prevent stowage of equipment gear between surface 70 and plate 16, so that such equipment does not interfere with travel of plate 16 toward seat 20.

As best seen in FIG. 3, cross bar 34 is fixed to the upper ends of rails 18 and flanges 36 project laterally from the ends of the cross bar. Fixed to flanges 36 are slanted stiffening rods 38 which pass on either side of seat 20. Rods 38 attach to brackets 40 that are fixed on plate 16.

As seen in FIGS. 2 and 3, seat assembly 10 has a heavy duty shock absorber 42 capable of absorbing shocks at least an order of magnitude greater than those resisted by cylinder 28. Explosive shocks absorbed by shock absorber 42 will typically be 100 to 150 times gravitational acceleration force. The shock absorber is centrally between rails 18 and its longitudinal axis is parallel to the rails. The shock absorber has a plunger 44, and return spring 48 biases plunger 44 to the plunger's extended position shown in the figures. Typically, the amount of shock absorbed by spring 48 is negligible compared to the total amount of shock absorbed by shock absorber 42. The plunger's disk-like terminus 46 normally is spaced from a stop 50 affixed to the back of seat 20. The spacing between terminus 46 and stop 50 prevents shock absorber 42 from reacting to ordinary road shocks, which are countered by cylinders 28. Only shocks above a given threshhold affect shock absorber 42, so that person 26 normally experiences the softer, less jolting ride provided by cylinders 28 acting alone.

Figure 4:
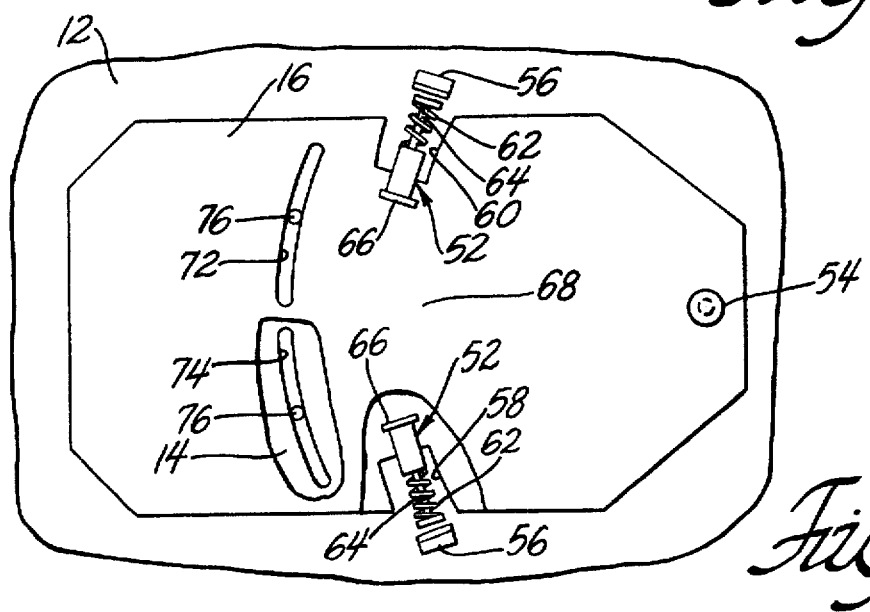
FIG. 4 is a plan view of a base plate of the seat assembly and horizontal shock absorber units thereon.

FIG. 4 is a plan view of base plate 16, horizontal shock absorbers 52 thereon and the nearby portion of floor 12, other elements being removed for purposes of illustration. At the fore end of plate 16 is a pin 54 fastened to floor 12, both plate 16 and pad 14 being swingable about pin 54. The swing of plate 16 and pad 14 is limited by stops 56 (shown only in FIG. 4) fixed relative to floor 12 on either side of plate 16. Shock absorbers 52 retard angular motion of the plate, and are preferably aligned generally tangential to an arc centered on pin 54. Shock absorbers 52 are fixed slantedly relative to plate 16 by brackets 66, and are slanted more laterally than forward with respect to the plate. Preferably, the lateral width of plate zone 68 between brackets 66 accommodates the bottom surface 70 of seat 20, so that shock absorbers 52 do not interfere with upward travel of plate 16 into contact with seat 20. Plate 16 and pad 14 respectively define notches 60 and 58 that accommodate stops 56 as the plate and pad swing. Shock absorber springs 62 along plungers 64 bias the plungers to the plunger's FIG. 4, extended position. Optionally, springs 62 are strong enough to appreciably cushion the relative side-to-side swinging of the plate and pad caused by lateral components of mine explosion forces.

Still referring to FIG. 4, plate 16 is optionally provided with arcuate slots, as at 72, which are centered on pin 54. Pad 14 will have comparable slots 74 that congruently register with slots 72. Upright pins 76 are fixed to floor 12 and extend therefrom in close sliding fit through slots 74 and into slots 72. The upper ends of pins 76 can be flush with respect to the upper surface of plate 16 or else slightly recessed with respect to that surface so as not to interfere with the travel of plate 16 to surface 70. Slots 72, slots 74 and pins 76 reduce the stress on pin 54 when plate 16 and pad 14 swing about pin 54.

I do not desire to be limited to the exact details of the invention disclosed herein since obvious modifications will occur to those skilled in the relevant arts without departing from the spirit and scope of the following claims.

What is claimed is:

1. A shock absorbing seat assembly for a vehicle, the assembly comprising:

a base plate adapted to be swingably and slidably mounted to a floor of the vehicle;

an aft end of the base plate;

a fore end of the base plate;

a pivot pin at the fore end of the base plate, the base plate swingable about the pivot pin;

a low friction pad between the floor and the base plate;

means for retarding and limiting swinging of the base plate;

a pair of upright rails fixed to the aft end of the base plate;

a seat disposed over the aft end of the base plate, the seat slidable on the rails;

first upright means connected between the aft end of the base plate and the seat for absorbing shocks below a chosen threshold and adjusting the seat's position relative to the base plate;

second upright means fixed to the aft end of the base plate for absorbing only shocks above said chosen threshhold, the second means able to absorb mine blast shocks greater than shocks absorbable by the first upright means.

2. The assembly of claim 1 further comprising:

a stop fixed to the seat;

a plunger terminus of the second means opposed to the stop;

the first means biasing the seat to a position where the stop is spaced from the terminus.

3. The assembly of claim 1 further comprising means for limiting travel of the seat away from the base and for blocking access to an unoccupied space between the seat and the base, the limiting and blocking means including a curtain fixed between the seat and the base.

4. The assembly of claim 1 wherein the retarding means includes a shock absorber oriented laterally outward from the base.

5. The assembly of claim 1 further comprising:

an arcuate slot defined by the base, the slot centered on the fore pin;

a slot pin fixed to the floor and extending into the slot.

* * * * *